United States Patent [19]
Noda et al.

[11] 3,891,009
[45] June 24, 1975

[54] HIGH-TEMPERATURE HEAT-INSULATING STRUCTURE

[75] Inventors: Fumiyoshi Noda, Toyota; Yukihisa Takeuchi, Aichi-ken, both of Japan

[73] Assignee: Toyota Jidosha Kogyo Kabushiki Kaisha, Japan

[22] Filed: Feb. 20, 1974

[21] Appl. No.: 443,986

[30] Foreign Application Priority Data
Feb. 24, 1973 Japan.............. 48-022503

[52] U.S. Cl. ............ 138/149; 106/85; 106/DIG. 2; 181/61; 264/262
[51] Int. Cl. .................... C04b 35/18; F16l 59/14
[58] Field of Search ........... 138/149, 144, 141, 148; 264/2, 262, 333; 181/61, 62; 60/272, 273, 282, 324; 106/85, 86, DIG. 2

[56] References Cited
UNITED STATES PATENTS

| | | | |
|---|---|---|---|
| 2,450,952 | 10/1948 | Greger | 106/85 |
| 2,747,994 | 5/1956 | Hoopes | 106/85 |
| 3,030,218 | 4/1962 | Robinson | 106/DIG. 2 |
| 3,042,578 | 7/1962 | Denning | 106/DIG. 2 |
| 3,167,439 | 1/1965 | Vukasovich et al. | 106/85 |
| 3,227,241 | 1/1966 | Mattoon | 181/62 |
| 3,352,814 | 11/1967 | Collins et al. | 106/85 |
| 3,511,674 | 5/1970 | Harris et al. | 106/85 |
| 3,552,445 | 1/1971 | Andrews | 138/149 |
| 3,658,564 | 4/1972 | Gerow et al. | 106/DIG. 2 |
| 3,730,744 | 5/1973 | Yavorsky | 106/85 |

*Primary Examiner*—Robert I. Smith
*Attorney, Agent, or Firm*—Brisebois & Kruger

[57] ABSTRACT

A high-temperature heat-insulating structure having a ceramic heat-insulating layer wherein foamable perlite particles and alumina are introduced into an Aqueous Solution of Monoaluminum Phosphate ($Al_2O_3 \cdot 3P_2O_5 \cdot 6H_2O$) to form a paste, the resultant paste is used to fill the space between the walls of a double-walled structure, and is fired at a high temperature.

5 Claims, 5 Drawing Figures

HIGH-TEMPERATURE HEAT-INSULATING STRUCTURE

BACKGROUND OF THE INVENTION

Conventionally, the heat-insulating material used with an automobile or motorcycle which is subjected to vibrations at a temperature of more than 500°C has been made of a ceramic fiber or been formed by applying a foamable paste to a heat-insulating member and foaming the paste.

However, in heat-insulating structures using ceramic fibers, a portion of the structure becomes pulverized after a long period of use and vibration. Furthermore, cavities are formed in the heat-insulating layer which degrade its heat-insulating properties.

When a ceramic fiber is used to make the heat-insulating layer of a manifold reactor, the layer is repeatedly subjected to thermal stresses due to temperature variations, and the welded portions of the steel structure which holds the heat-insulating layer are broken away. Ceramic fibers tend to be sucked through the broken portion into the exhaust gas, and this may result in the locking of a bypass valve in a catalytic converter or a valve in an exhaust gas recirculator (E G R), or the like.

Furthermore, when a heat-insulating layer is formed by applying a foamable paste to a supporting member and foaming the paste, the layer formed by the paste tends to peel off when subjected to vibration, so that the heat-insulating properties of the article deteriorate rapidly. One known heat-insulating structure similar to these according to the present invention is made by introducing a ceramic paste between the walls of a double-walled steel structure and then drying and firing it to solidify the ceramic, but the ceramic paste is of a low fluidity and thus is incapable of forming a uniform heat-insulating layer when the structure is complicated, as in the case of the exhaust gas purifier of an automobile, and the heat-insulating layer is thin. Also, this type of heat-insulating member has a high specific gravity and not too good an insulator.

SUMMARY OF THE INVENTION

It is an object of this invention to provide a light heat-insulating structure which has vibration-resisting properties and is adaptable for use in an exhaust pipe, a manifold reactor, a catalytic converter for an automobile or motorcycle or the like, which are subjected to vibration stresses at high temperatures (more than 500°C).

DETAILED DESCRIPTION OF THE INVENTION

Figure 1:
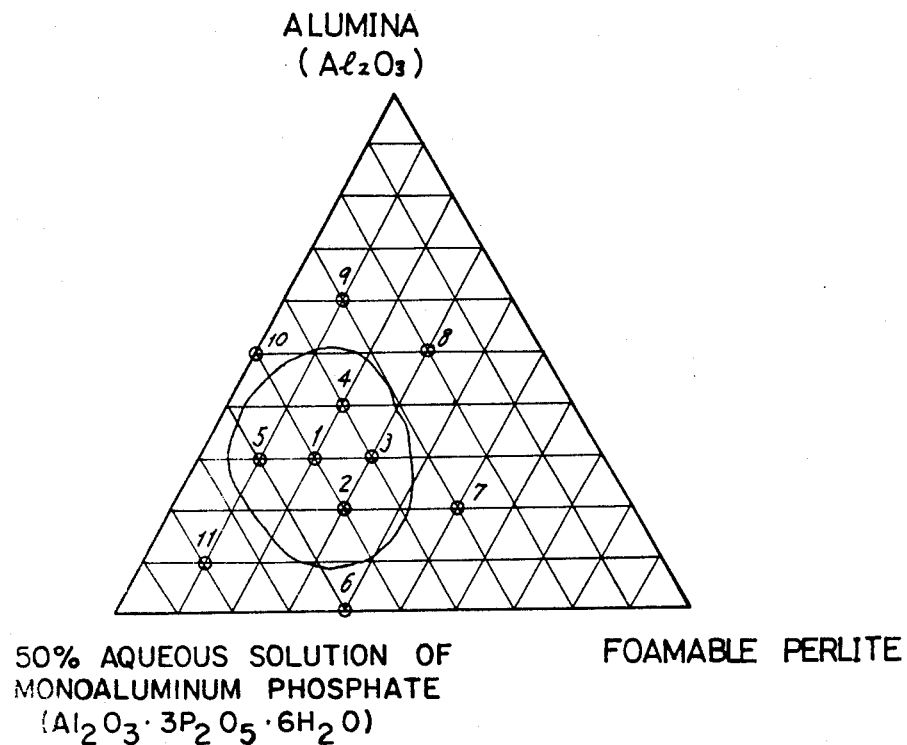
FIG. 1 is a composition diagram of a three constituent system for use in manufacturing a high-temperature insulating structure according to the present invention.

In the drawings, reference numeral 1 indicates an engine, 2 a manifold reactor, 3 an exhaust pipe, 4 a pre-muffler, 5 a catalytic converter, 6 a main muffler, 7 a flange, 8 a bolt hole, 9 a heat-insulating layer, 10 a catalytic material, 11 the outer casing of a manifold reactor, and 12 the inner core of a manifold reactor. Reference characters a and b indicate an outer cylinder and an inner cylinder, respectively.

Table 1 shows the results with respect to heat-resisting temperatures, vibration-resisting properties, filling properties, and heat-insulating properties of each of the heat-insulating structures are produced by varying the ratio between water, monoaluminum phosphate, and alumina particles.

In Table 1, monoaluminum phosphate and water were used in the ratio of 1:1 by weight. The term "heat-resisting temperature" means a temperature at which the rate of volumetric contraction is not more than 1 percent at firing for 5 consecutive hours. In evaluating the vibration-resisting properties, compositions which stand the test of vibration at 90 Hz, at ± 45 G for 5 consecutive hours are designated ⊚, compositions which stand the test of vibration at 90 Hz, at ± 20 G for 5 consecutive hours are designated O, and compositions which become pulverized under the above conditions are designated x.

Figure 3:
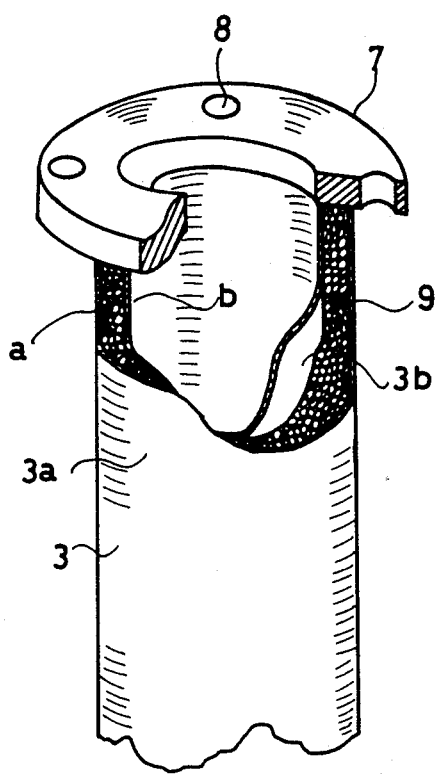
FIG. 3 is a perspective view, partially broken away, of a double-walled exhaust pipe.

A straight double-walled pipe as shown in the FIG. 3 which is 300 mm long, with the inner diameter of its outer cylinder 52 mm and the outer diameter of its inner cylinder 36 mm (each cylinder being 1.5 mm in thickness and the heat-insulating layer being 8 mm in thickness) was used as a test specimen. The filling properties were evaluated on the basis of the difficulty in filling while the manifold reactor was being vibrated, and the following three classifications were made: compositions with which it is easy to fill the vessel were designated ⊚, compositions with which the vessel could be filled with only normal difficulty were designated O, and compositions with which it was hard to fill the vessel were designated x.

The heat-insulating properties were rated ⊚ when the heat conductivity was less than 0.15 Kcal/m Hr°C at a temperature of 800°C, O when the heat conductivity was 0.15 through 0.20 Kcal/m Hr°C, and x when the heat conductivity was more than 0.20 Kcal/m Hr°C.

The abnormal foaming properties were rated ⊚ when no space was generated, O when there were small spaces, and x in the case when there were large spaces, when the composition was expanded and solidified at a temperature of 550°~650°C after completely filling the space into which it was introduced.

With respect to the overall appraisal, a composition which has a high utility was rated ⊚, a composition which has a normal utility was rated O, and a composition which has no utility was rated x.

TABLE 1

| No. | Constituent | | | | Properties | | | | | |
|---|---|---|---|---|---|---|---|---|---|---|
| | mono-aluminum phosphate + water | alumina | perlite | heat-resisting temperature | vibration-resistance | filling | heat resistance | abnormal foamability | appraisal |
| 1 | 50 | 30 | 20 | 1100 | ⊚ | ⊚ | ⊚ | ⊚ | ⊚ |
| 2 | 50 | 20 | 30 | 1100 | ⊚ | ⊚ | ⊚ | ⊚ | ⊚ |
| 3 | 40 | 30 | 30 | 1100 | ⊚ | ⊚ | ⊚ | ⊚ | ⊚ |

TABLE 1—Continued

| No. | Constituent | | | | Properties | | | | |
| --- | --- | --- | --- | --- | --- | --- | --- | --- | --- |
| | mono-aluminum phosphate + water | alumina | perlite | heat-resisting temperature | vibration-resistance | filling | heat resistance | abnormal foamability | appraisal |
| 4 | 40 | 40 | 20 | 1100 | ◎ | ◎ | ◎ | ◎ | ◎ |
| 5 | 60 | 30 | 10 | 1100 | ◎ | ◎ | ◎ | ◎ | ◎ |
| 6 | 60 | 0 | 40 | 1000 | o | ◎ | ◎ | x | x |
| 7 | 30 | 20 | 50 | 950 | x | x | o | o | x |
| 8 | 20 | 50 | 30 | 1000 | x | x | o | o | x |
| 9 | 30 | 60 | 10 | 1050 | x | x | x | o | x |
| 10 | 50 | 50 | 0 | 1200 | o | ◎ | o | ◎ | o |
| 11 | 80 | 10 | 10 | 1000 | x | ◎ | x | x | x |

On the basis of composition No. 1 in Table 1, the characteristics of various heat-insulating structures which are produced by varying the weight ratio of monoaluminum phosphate to water were tested as to the items in Table 1 and the results are shown in Table 2.

TABLE 2

| proportion of water | constituent | | | properties | | | | | |
| --- | --- | --- | --- | --- | --- | --- | --- | --- | --- |
| | mono-aluminum phosphate + water | mono-aluminum phosphate | water | heat-resisting temperature | vibration resistance | filling | heat insulating | abnormal foamability | appraisal |
| 0 | 50 | 50 | 0 | 1150 | x | x | x | x | x |
| 10 | 50 | 45 | 5 | 1150 | ◎ | x | o | x | x |
| 20 | 50 | 40 | 10 | 1150 | ◎ | x | o | x | x |
| 30 | 50 | 35 | 15 | 1150 | ◎ | o | ◎ | o | o |
| 40 | 50 | 30 | 20 | 1100 | ◎ | ◎ | ◎ | ◎ | ◎ |
| 50 | 50 | 25 | 25 | 1100 | ◎ | ◎ | ◎ | ◎ | ◎ |
| 60 | 50 | 20 | 30 | 1100 | ◎ | ◎ | ◎ | ◎ | ◎ |
| 70 | 50 | 15 | 35 | 1000 | o | ◎ | ◎ | o | o |
| 80 | 50 | 10 | 40 | 950 | x | ◎ | o | x | x |
| 90 | 50 | 5 | 45 | not solidified | — | — | — | — | — |
| 100 | 50 | 0 | 50 | " | — | — | — | — | — |

The chemical analysis and physical properties of a foamable perlite which was used for the tests of Tables 1 and 2 are shown in Table 3.

Table 3

| Chemical Analysis | | Physical Property |
| --- | --- | --- |
| Name of Constituent | Value of Analysis (%) | |
| $SiO_2$ | 75.5 | Standard Density 0.17 g/cm³ |
| $Al_2O_3$ | 15.3 | |
| $Fe_2O_3$ | 0.9 | Diameter of Particle 10 – 3000 μ |
| CaO | 0.12 | |
| $K_2O$ | 4.0 | Refractoriness SK 6 a |
| $Na_2O$ | 3.5 | |

As a result of the Tables 1 and 2, the composition diagram of a three constituent system was obtained as shown in FIG. 1.

Figure 2:
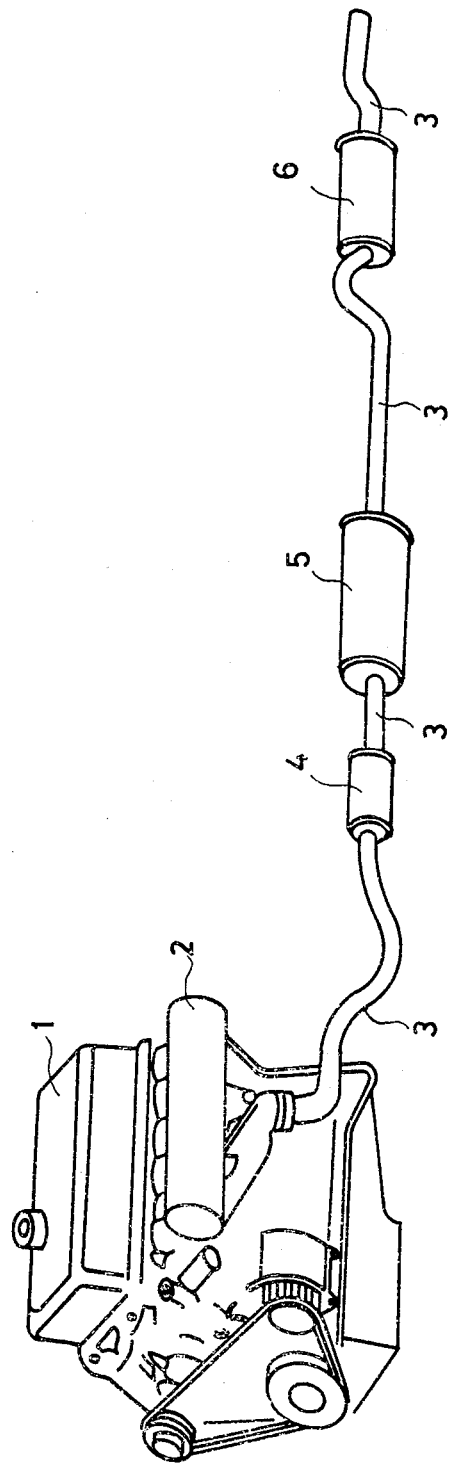
FIG. 2 is a diagramatic view of the exhaust system of an automobile.

The effects of the present invention were confirmed by applying a high-temperature heat-insulating structure according to the present invention to the exhaust system of an automobile. The exhaust system of the automobile is diagramatically shown in the FIG. 2. As shown in the FIG. 2, the exhaust system comprises an engine 1, a manifold reactor 2, a double-walled exhaust pipe 3, a premuffler 4, a catalytic converter 5 and a main muffler 6.

FIG. 3 is a perspective view, partially broken away, of the double-walled exhaust pipe provided with a flange 7, a bolt hole 8, and a heat-insulating layer 9.

Figure 4:
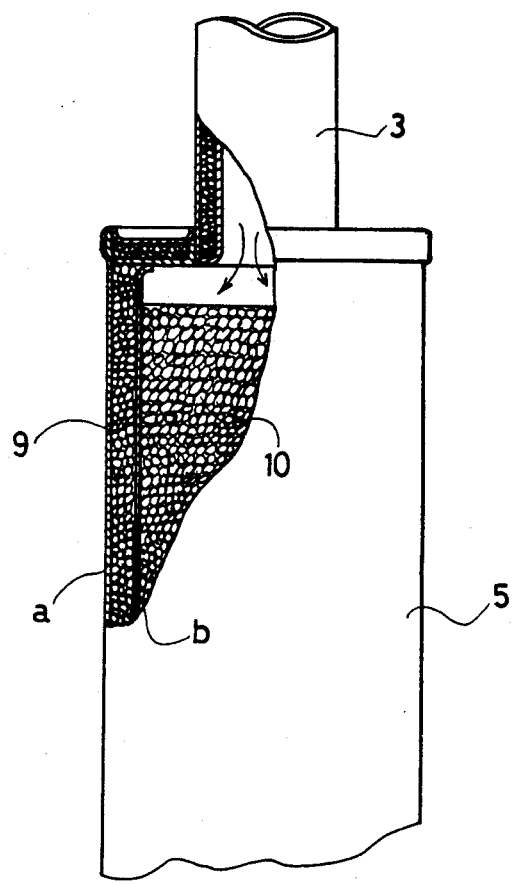
FIG. 4 is a perspective view, partially broken away, of a catalytic convertor.

FIG. 4 is a perspective view, partially broken away, of a catalytic converter comprising a heat-insulating layer 9 and a catalytic filler 10.

Figure 5:
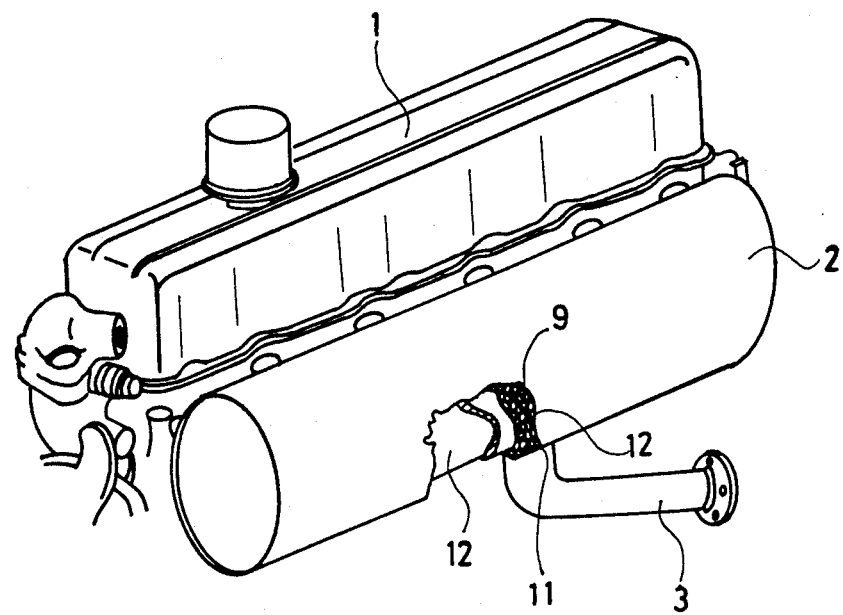
FIG. 5 is a perspective view, partially broken away, of a manifold reactor.

FIG. 5 is a perspective view 1 partially broken away, of an engine and a manifold reactor.

In the FIGS. 3 through 5, the outer cylinder is designated a and the inner cylinder is designated b.

The effects of the heat-insulating structures according to the present invention will now be explained in detail by way of examples.

EXAMPLE 1

After 210 g water had been mixed with 210 g of monoaluminum phosphate to form a viscous liquid, 180 g of Perlite (as set forth in Table 3, available from Mitsui Kinzoku Kogyo K.K.) and 270 g of alumina particles (grain size 200 mesh) were introduced into the liquid to produce homogeneity, thereby forming a paste. The paste was then used to fill a metal mold which had a space 54 mm in diameter and 50 mm high. The cover of the metal mold was then secured by bolts and the metal mold was then fired for 30 minutes in a furnace at a temperature of 600°C.

In firing, a portion of the paste overflowed from the metal mold through small gaps therein due to expansion. The resultant heat-insulating material or member (bulk density - 0.75 g/cm³) was cut into test specimens 20 × 20 × 40 mm. 2 types of test specimens were then produced from the above test specimens, one (having a rate of volumetric contraction of 2 to 3 percent) which was fired in a furnace for 50 consecutive hours at a temperature of 1150°C, and the other (having a rate of volumetric contraction less than 1 percent) which was fired in a furnace for 150 consecutive hours at a temperature of 1100°C.

Heat impact tests in which the specimen was suddenly heated from room temperature to 1000°C and forcibly air cooled from 1000°C to room temperature were repeated 1000 times for said test specimens. However, no cracks were generated. Also, a stainless steel jig provided with the fired heat-insulating composition was vibration tested at 90 Hz, at 45 G for 5 consecutive hours. No abnormalities resulted.

EXAMPLE 2

The paste of Example 1 was caused to flow through a hole 30 mm in diameter to fill the space between the outer and the inner cylinders of a double-walled exhaust pipe (to form an insulating layer 8 mm in thickness) as shown in the FIG. 3, any large gaps were eliminated and most holes were closed, leaving only gaps through which steam could escape. A rigid heat-insulating layer was then produced by firing the paste in a furnace at 550°C for an hour after filling. The resulting double-walled exhaust pipe was tested for heat-insulating properties and durability with the pipe mounted on an automobile as shown in the FIG. 2. When the temperature of the exhaust gas which passed through the exhaust pipe was 700°C, the temperature of the surface of the outer cylinder was 179°C. After the automobile had run over a bad road for 50,000 Km, no deterioration in heat-insulating properties was found.

After the above test, the exhaust pipe was divided into 5 equal parts, and the state of each part was examined. No scattering, pulverizing or contraction of the heat-insulating composition was found. Also, two of the 5 parts of the exhaust pipe were cut longitudinally and the extent to which the heat-insulating material filled the space was observed. This was found to be satisfactory.

EXAMPLE 3

A heat-insulating layer was formed in the space between the outer and the inner cylinders of a catalytic converter (see FIG. 4) by filling, heating and firing in the same way as in Example 1.

The catalytic converter was filled with a platinum catalyst and mounted on an automobile, and its heat-insulating properties and durability were tested. As a result of driving the automobile at an engine rotation of 4000 r.p.m., the temperature of the catalytic filler was 710°C, but the temperature of the surface of the outer cylinder was 180°C to 205°C. Also, after running over a bad road for 50,000 Km, when test specimens were cut from the converter as in Example 2, no contraction and no cracks were found.

EXAMPLE 4

The paste of Example 1 was used to fill the space between the outer and inner cylinders of a manifold or thermal reactor (See FIG. 5) and was heat-solidified in a furnace at 600°C for an hour. After the formation of a heat-insulating layer incorporated into the manifold reactor, the reactor was mounted on an automobile and its heat-insulating properties and durability were tested. As a result of driving at an engine rotation of 4500 r.p.m. the temperature of the inner casing of the manifold reactor was 1080°C, while the temperature of the outer surface of the manifold reactor was 275°C, the temperature of the gas in the double-walled exhaust pipe was 720°C, and the temperature of the outer surface of the double-walled exhaust pipe was 198°C, which indicated that the heat-insulating properties were good. Also, after running over a bad road for 50,000 Km, the heat-insulating layer was cut and examined in a manner similar to that of Example 2. No pulverization, contraction or cracking was found and the space occupied by the heat-insulating material was well filled.

EXAMPLE 5

The paste of Example 1 was used to fill a metal mold having dimensions of 300 × 200 × 100 mm and fired in a furnace at 650°C for 20 minutes to form a block. The block had a density of 0.52 g/cm$^3$ and thus was very light. This block was fired again in a furnace of 1100°C for 150 hours. Its rate of volumetric contraction was 2 –3 percent. The block was then sectioned and its inner composition examined. Air cells were found to be uniformly distributed.

EXAMPLE 6

1 percent by weight of "Corn powders" (which may include egg yolk or carboxy methyl cellulose or the like) were applied to the paste of Example 1 as a foam stabilizer. The mixture was stirred and then introduced into a manifold reactor (see FIG. 5). The paste was expanded and solidified in a furnace at 600°C. The manifold reactor was then mounted on an automobile and the automobile was operated at an engine rotation of 4000 r.p.m. for 35,000 Km. No abnormalities were found. The density of the heat-insulating member was 0.45 g/cm$^3$.

As a result of the above tests, it will be apparent that this invention has the following advantages:

Firstly, since the heat-insulating layer according to this invention is formed by expanding the heat-insulating composition, compressed inner stresses are generated within the heat-insulating layer and its vibration-resisting properties are significantly increased, and the heat-insulating effect is higher, as compared with a conventional product.

Secondly, since upon forming the heat-insulating layer according to the present invention, the paste may be introduced by means of flowing, pressure or suction, the operation is simple. Also, since filling can be effected even if the configuration is complicated or the space is small, the articles in accordance with the present invention can be manufactured at a fourth to a fifth of the cost of a conventional article.

While in the examples given the specimens were fired by heating them for more than 20 minutes at 550°–650°C, it will be appreciated that they could also be fired by heating them for a longer time at somewhat lower temperatures or for a shorter time at slightly higher temperatures. Furthermore, these represent essentially minimum figures. Heating at slightly higher temperatures or for a longer time would not be injurious, but would simply involve a greater expense.

What is claimed is:

1. A heat-insulating structure comprising a casing filled with a fired ceramic consisting essentially of monoaluminum phosphate, foamed perlite and alumina.

2. A heat-insulating structure as claimed in claim 1 in which said casing is defined by the inner and outer walls of a double-walled component of an automotive exhaust system.

3. A method of making a heat-insulating structure which comprises the steps of introducing into a casing a mixture of water, monoaluminum phosphate, foamable perlite, and alumina, and firing said mixture within said casing.

4. A method as claimed in claim 2 in which said mixture is heated within said casing at about 550°~650°C more than 20 minutes.

5. A method as claimed in claim 3 in which said mixture comprises substantially equal parts of water and monoaluminum phosphate by weight.

* * * * *